(12) United States Patent
Sreenivas et al.

(10) Patent No.: US 7,747,634 B2
(45) Date of Patent: Jun. 29, 2010

(54) RICH DATA TUNNELING

(75) Inventors: Mahesh K. Sreenivas, Sammamish, WA (US); Benjamin Leon Grol-Prokopczyk, Redmond, WA (US); Jack S. Richins, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 11/683,515

(22) Filed: Mar. 8, 2007

(65) Prior Publication Data

US 2008/0222200 A1 Sep. 11, 2008

(51) Int. Cl.
*G06F 17/30* (2006.01)

(52) U.S. Cl. .................. 707/756; 707/736; 707/822

(58) Field of Classification Search ............... 707/1–10
See application file for complete search history.

(56) References Cited

U.S. PATENT DOCUMENTS

| | | | |
|---|---|---|---|
| 4,896,277 A * | 1/1990 | Vercellotti et al. | 710/9 |
| 5,023,873 A * | 6/1991 | Stevenson et al. | 714/4 |
| 5,806,078 A | 9/1998 | Hug et al. | |
| 5,835,906 A * | 11/1998 | Hagersten et al. | 707/8 |
| 5,873,097 A * | 2/1999 | Harris et al. | 707/203 |
| 6,023,704 A * | 2/2000 | Gerard et al. | 707/103 R |
| 6,088,694 A | 7/2000 | Burns et al. | |
| 6,105,122 A * | 8/2000 | Muller et al. | 712/1 |
| 6,148,349 A * | 11/2000 | Chow et al. | 710/33 |
| 6,256,740 B1 * | 7/2001 | Muller et al. | 726/12 |
| 6,263,491 B1 * | 7/2001 | Hunt | 717/130 |
| 6,363,178 B1 | 3/2002 | Chiba et al. | |
| 6,438,612 B1 * | 8/2002 | Ylonen et al. | 709/249 |
| 6,560,616 B1 | 5/2003 | Garber | |
| 6,651,058 B1 * | 11/2003 | Sundaresan et al. | 707/6 |
| 6,711,632 B1 * | 3/2004 | Chow et al. | 710/29 |
| 6,856,993 B1 * | 2/2005 | Verma et al. | 707/101 |
| 6,961,726 B1 | 11/2005 | Eisenberg et al. | |

(Continued)

FOREIGN PATENT DOCUMENTS

WO 0049535 8/2000

(Continued)

OTHER PUBLICATIONS

Amit Singh, "A File System Change Logger" May 2005, Online Article.*

(Continued)

*Primary Examiner*—Mohammad Ali
*Assistant Examiner*—Sheryl Holland
(74) *Attorney, Agent, or Firm*—Workman Nydegger

(57) ABSTRACT

When rich data is tunneled, its associated link identified by a primary data reference is changed by swapping primary references of original data with changed data. Thus, without duplicating the rich data, it is now associated with the changed data, preserving it in constant time. The primary references can include, but are not limited to, names and/or other item identifications. This technique allows preservation of rich data to occur without burdening processing and/or time constraints based on the size and/or number of rich data elements. The technique also allows disparate applications and/or systems to maintain data integrity even when rich data is not expected for a given application and/or system. Since the rich data follows a primary reference, awareness of the rich data is not required for it to be properly handled, ensuring its integrity.

12 Claims, 8 Drawing Sheets

U.S. PATENT DOCUMENTS

| | | | |
|---|---|---|---|
| 7,222,130 B1* | 5/2007 | Cras et al. | 707/103 R |
| 7,392,263 B2* | 6/2008 | Acharya et al. | 707/102 |
| 7,478,116 B2* | 1/2009 | Sreenivas et al. | 707/203 |
| 2002/0078069 A1 | 6/2002 | Moore | |
| 2002/0133491 A1 | 9/2002 | Sim et al. | |
| 2003/0018669 A1 | 1/2003 | Kraft | |
| 2003/0074356 A1* | 4/2003 | Kaler et al. | 707/9 |
| 2004/0003013 A1* | 1/2004 | Coulthard et al. | 707/205 |
| 2004/0039990 A1* | 2/2004 | Bakar et al. | 715/505 |
| 2004/0236655 A1* | 11/2004 | Scumniotales et al. | 705/36 |
| 2005/0015354 A1* | 1/2005 | Grubbs et al. | 707/1 |
| 2005/0278382 A1* | 12/2005 | LaRocca et al. | 707/200 |
| 2006/0074939 A1 | 4/2006 | Mazzagatti et al. | |
| 2006/0136501 A1 | 6/2006 | Ijeomah et al. | |
| 2007/0083673 A1* | 4/2007 | Lara et al. | 709/246 |
| 2008/0250021 A1* | 10/2008 | Boys et al. | 707/9 |
| 2008/0256275 A1* | 10/2008 | Hofstee et al. | 710/100 |
| 2010/0011033 A1* | 1/2010 | Czeczulin | 707/204 |

FOREIGN PATENT DOCUMENTS

| | | |
|---|---|---|
| WO | 02069186 A1 | 9/2002 |

OTHER PUBLICATIONS

"Virtual Private Networking: An Overview", Sep. 4, 2001, Microsoft TechNet, Online Reference.*

"VPN Concepts in ISA Server 2006", 2009, Microsoft TechNet, Online Reference.*

Corbett, et al. "The Vesta Parallel File System" (1996) ACM, 40 pages.

Phelps, et al. "The Multivalent Browser: A Platform for New Ideas" (2001) USENIX Sage, 17 pages.

"Metadata Efficiency in Versioning File Systems" (2003) Proceedings of the FAST'03 2nd USENIX Conference on File & Storage Technologies, 17 pages.

* cited by examiner

RICH DATA TUNNELING

BACKGROUND

Most traditional file systems do not support transactional capabilities. Applications need to give better guarantees to the user in terms of maintaining data integrity when unexpected events like power glitches, hard disk errors, etc. occur as they try to save files. In the absence of transactional capabilities, applications employ various schemes to maintain data integrity of files. A common strategy involves writing to a temporary file whenever an update is performed and its contents are saved. On a successful completion of the write and save operation on the temporary file, applications replace the original file with the temporary file. Typically, the files are identified by their names, although most file systems also use one or more additional internal identifiers. The strategy described above, often referred to as safe save, creates an illusion to the user that his/her actions were always directly happening to the original file.

Note, however, that some key data in the original file could be lost as part of replacing the original file with the temporary file. For example, in the case of NTFS (one of the file systems supported by Microsoft Windows operating system) these key data may include creation time, long/short name, object ID, alternate streams, etc. Operating systems may provide one or more APIs to assist users in automatically copying over some of these key data while doing safe save of files. The process of copying over one or more of the attributes (and data in some occasions) from one file to another by the operating system is called Attribute Tunneling. Attribute tunneling typically gets triggered when a file name disappears and reappears in the same directory within a stipulated time. File names can disappear through delete, rename or move operations. And, they can reappear through create, rename or move operations. Sometimes, applications may have to copy more data (e.g., security descriptor) or attributes in addition to what the operating system provides while doing a safe save.

Richer storage systems often provide the ability to associate or attach additional data like sticky notes, annotations, references, pictures, etc. to items including files. These additional data (rich data) can be arbitrary in their number and size. For efficiency, these systems internally tend to associate the rich data with the ID of the item (say, itemID). As part of the safe save operation the temporary file created gets a new ID and subsequently when the original file is replaced with the temporary file, the rich data associated with the ID of the original file fails to get transferred. To the user this manifests as simple loss of data, partial or full, while doing an operation like saving a document.

This type of traditional file saving requires that applications and systems be aware of rich data and how to preserve it. As often is the case, different applications and different systems can be of varying levels of sophistication and age, causing mismatches between how data is saved. Thus, if a system is not expecting rich data, it may not properly transfer it to the changed data. Additionally, the act of transferring the data can also add to the processing burden of a system or application depending on the size and number of data elements associated with the core data.

SUMMARY

Primary references for data are leveraged to allow constant time preservation of rich data regardless of the size and/or number of rich data elements. The primary references can include, but are not limited to, names and/or other item identifications. When rich data is tunneled, its associated link identified by the primary reference is changed by swapping primary references of the original data with the changed data. Thus, without duplicating the rich data, it is now associated with the changed data, preserving it in constant time. This technique allows preservation of rich data to occur without burdening processing and/or time constraints based on the size and/or number of rich data elements, substantially increasing data integrity, decreasing time required for data saves, and decreasing processing power required for data saves. The technique also allows disparate applications and/or systems to maintain data integrity even when rich data is not expected for a given application and/or system. Since the rich data follows a primary reference, awareness of the rich data is not required for it to be properly handled, ensuring its integrity.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
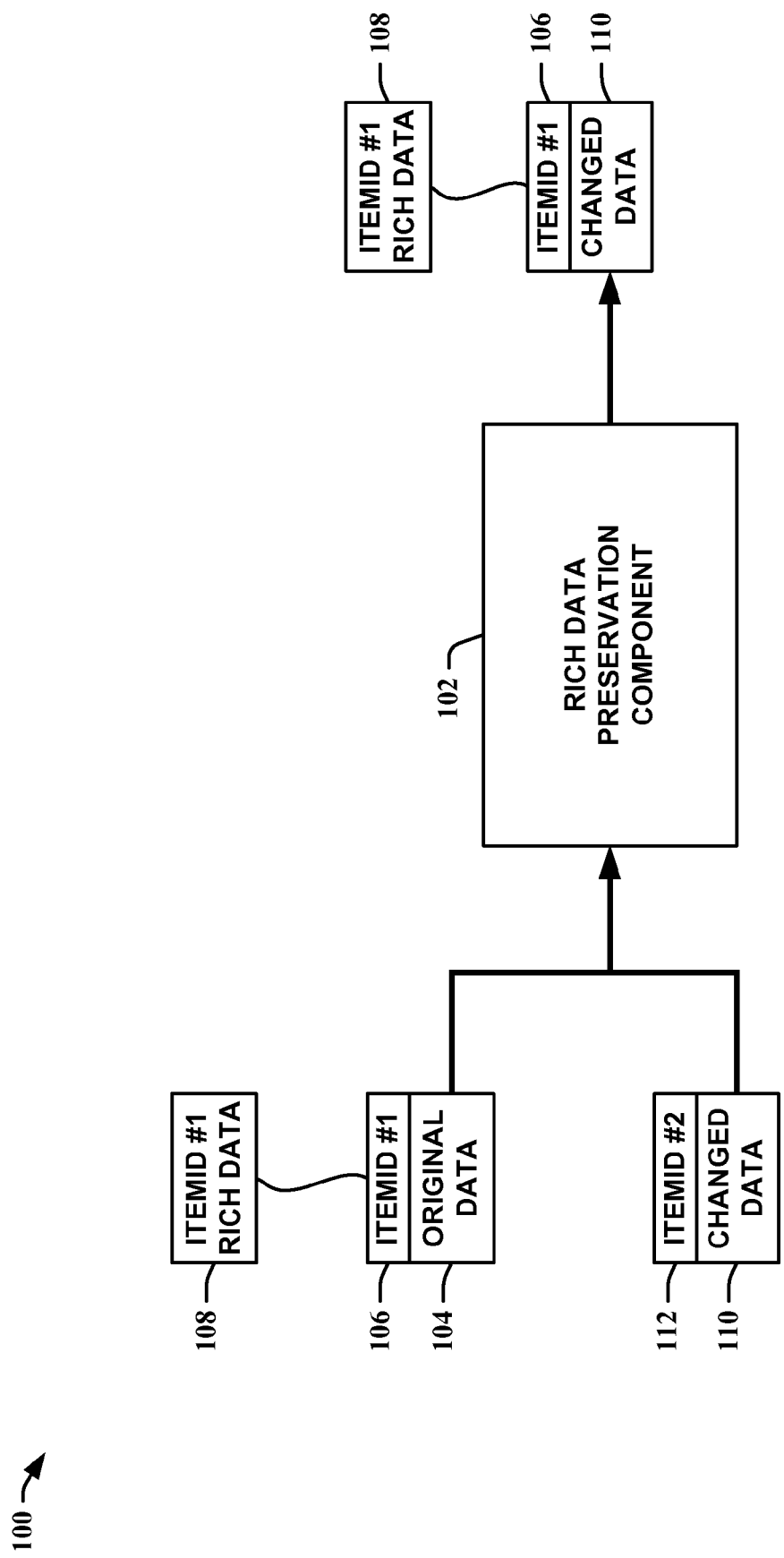
FIG. 1 is a block diagram of a data preservation system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details.

In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Rich storage systems allow extra information to be associated with data being stored. The extra information is typically referred to as "rich data" and generally is associated with stored data items using a primary reference or "item identification (itemID)" that refers to the stored data items. The mechanisms disclosed herein allow rich storage systems to interact with "non-rich" systems and applications and still maintain rich data. The mechanisms accomplish this in constant time regardless of the size and/or quantity of rich data. This allows rich storage systems to interact with relational and legacy file systems alike without losing and/or corrupting data.

FIG. 1 illustrates a data preservation system 100 that utilizes a rich data preservation component 102 to tunnel rich data 108 associated with original data 104 via its primary reference identification (e.g., itemID #1). In this example, original data 104 has a primary reference identification of itemID #1 106. Changed data 110 represents, in this example, a copy of the original data 104 that has been altered prior to a data save. The changed data 110 has a primary reference identification of itemID #2 112. The rich data preservation component 102 typically provides rich data tunneling for data items when triggered by an event such as, for example, move, rename, create, etc. In this illustration, a save has been commanded and the intent is for the changed data 110 to overwrite the original data 104 while preserving the rich data 108 associated with the original data 104. The rich data preservation component 102 leverages the association between the rich data 108 and the primary reference identification itemID #1 106 to preserve the rich data 108. The itemID's 106, 112 are stored in temporary storage (e.g., tunnel cache) where they are swapped. Thus, the rich data preservation component 102 re-identifies the changed data 110 from primary reference itemID #2 112 to primary reference itemID #1. The rich data 108 association to the primary reference ID #1 remains intact and, thus, the rich data 108 is now effectively attached to the changed data 110 since the changed data 110 is now referenced as itemID #1 106.

The data preservation system 100 can tunnel rich data even if a data system is unaware of the rich data 108. This allows the data preservation system 100 to operate within rich and/or non-rich systems and/or applications alike to preserve the rich data 108. This is especially useful when rich data systems/applications are utilized with legacy systems/applications. Another advantage of the rich data preservation system 100 is that the rich data 108 is preserved in constant time regardless of the size and/or number of rich data elements contained in the rich data 108. Since the rich data 108 is not duplicated, its size and/or number of elements does not impact the preservation of the rich data utilizing mechanisms disclosed herein. This can substantially increase the performance of a system and/or application and the like and allow for better resource utilization and/or planning (process time is a constant value).

Figure 2:
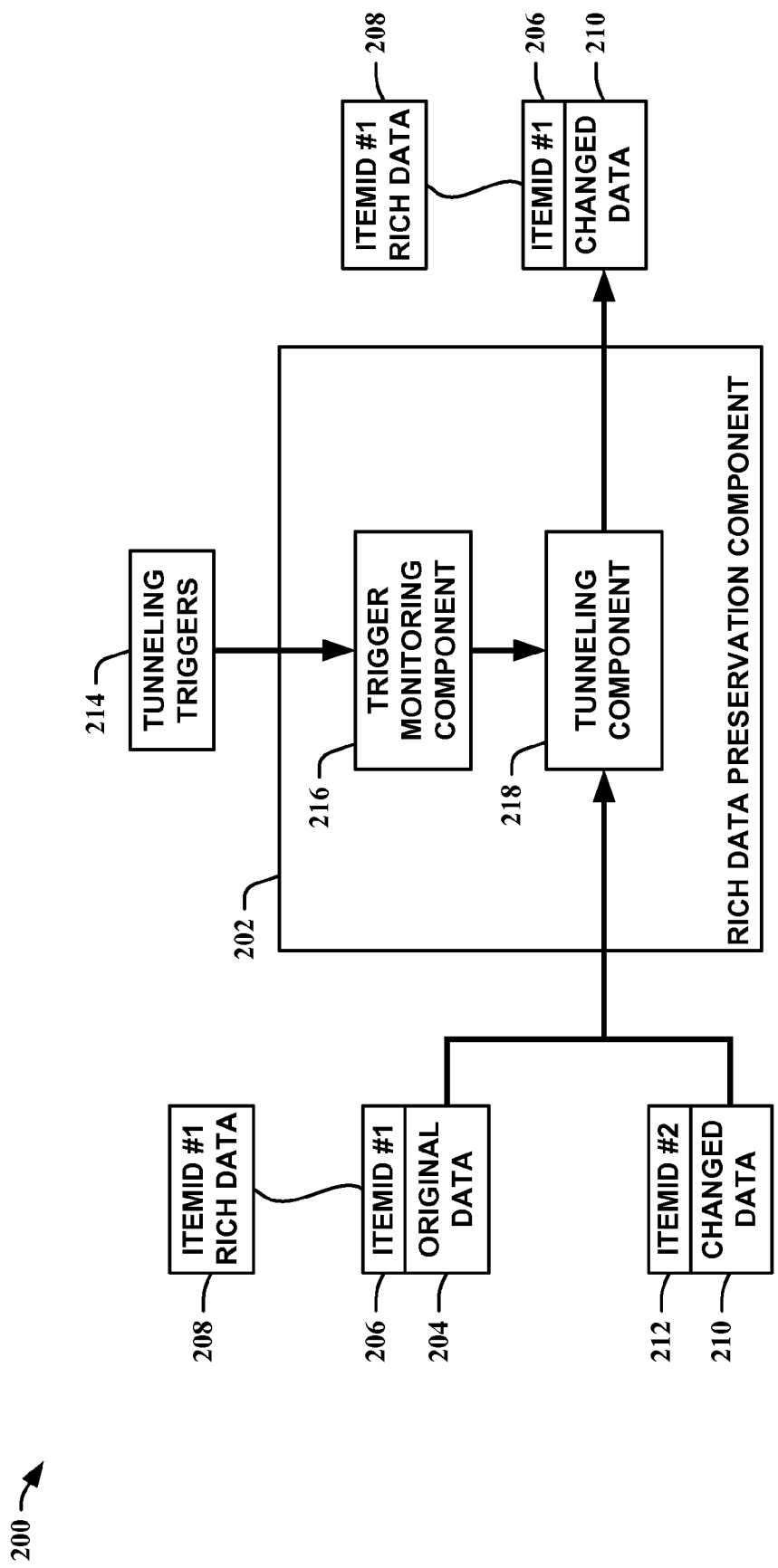
FIG. 2 is another block diagram of a data preservation system in accordance with an aspect of an embodiment.

A data preservation system 200 shown in FIG. 2 employs a rich data preservation component 202 that utilizes a trigger monitoring component 216 and a tunneling component 218. The trigger monitoring component 216 monitors tunneling triggers 214 and initiates rich data tunneling when a trigger event occurs. The tunneling triggers 214 can include, but are not limited to, a rename-rename file system operation, a delete-create file system operation, a delete-rename file system operation, and/or a rename-create file system operation and the like that causes a file name to disappear and reappear in the same directory (namespace). Once initiated by the trigger monitoring component 216, the tunneling component 218 receives original data 204 with itemID #1 206 and changed data 210 with itemID #2 212. The primary references of the data sets 206, 212 are stored, for example, in tunnel cache and switched to preserve rich data 208 associated to itemID #1 206. In this manner, the changed data 210 is now associated with a primary reference of itemID #1 206. Since rich data 208 is associated with itemID #1 206, this effectively transfers the rich data 208 from the original data 204 to the changed data 210 in constant time.

Figure 3:
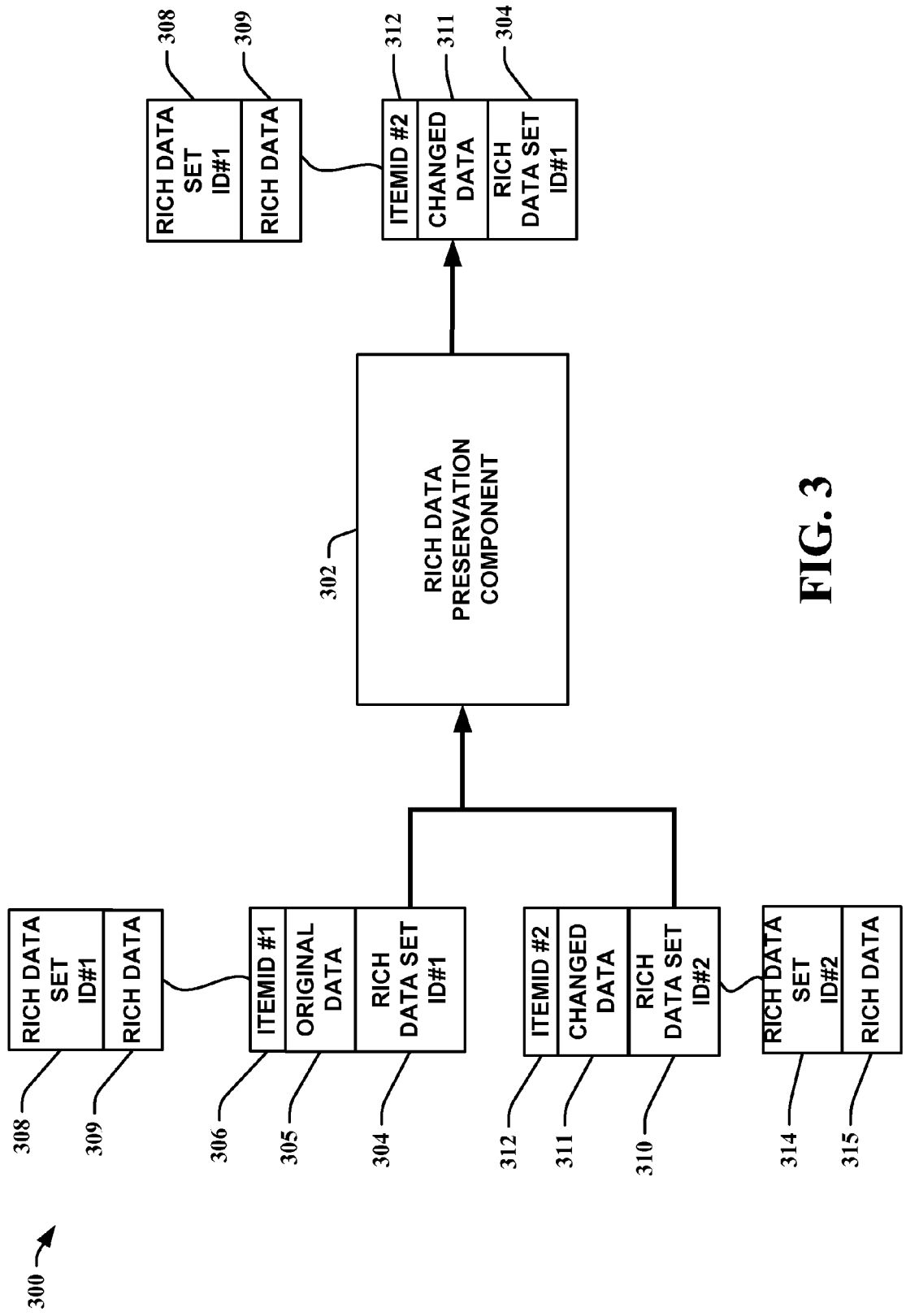
FIG. 3 is yet another block diagram of a data preservation system in accordance with an aspect of an embodiment.

Occasionally, systems/applications can levy restrictions on altering primary references. These restrictions can interfere with the mechanisms described supra. Thus, when the primary references are immutable, primary identification associations stored with the rich data itself can be utilized, typically by introducing another level of indirection. Thus, in FIG. 3, a data preservation system 300 employs a rich data preservation component 302 that acts on primary identification associations 306, 312 (ItemID #1, and itemID#2), used by rich data set ID #1 and rich data set ID #2, respectively. The primary identification associations 306, 312 respectively point (associate) the rich data sets 304, 310, and original data 305, or changed data 311 to their respective data sets 308, 314. When triggered, the rich data preservation component 302 swaps the primary identification associations (itemID #1, itemID #2) 306, 312 of the rich data sets 304, 310. Now, rich data set ID #1 304 is effectively associated with rich data set ID#2 314 instead of rich data set ID# 1 (previous association). This allows rich data set ID#1 304 to be preserved with rich data set ID#2 314 in constant time via switching of the primary reference associations of the rich data sets 304, 310. Thus, data set primary references were not altered while rich data from an original data set (e.g., original document before editing) was preserved (e.g., associated) with another data set (e.g., a changed document, etc.). It can be appreciated that this technique can be applied to further levels of association as desired. This allows preservation of data in constant time despite the number of restrictions on primary, association, and/or identifying/linking information and the like. In yet other instances, proxies can be established as necessary to allow linking to a proxy and then between proxies and then back to the original source. This allows tunneling of rich data despite restrictions between two data sets.

As an implementation example, a rich data preservation system can be utilized in a rich storage system that can include relational file systems. Typically, every item in a relational file system has a unique identifier or itemID. Relational file systems have richer capabilities that let users create and attach additional data to files. The attached data is often arbitrary in number and size. This rich data can include, for example, sticky notes, annotations, additional properties normally not contained in a basic file type, references to other files, and/or a variety of custom data that a user can add on. In addition, the relational file system can further store additional derived data to support, for example, efficient searches. Legacy applications are not aware of the presence of the rich data and, thus, it can get lost during a system store process of files and/or documents. The mechanisms herein prevent the loss of rich data attached to data items in relational file systems and other systems. They accomplish this in constant time regardless of the size of the rich data and/or the number of rich data elements. Knowledge of whether rich data elements exist or not is also not required to employ these mechanisms.

For example, traditional attribute tunneling for a data item is typically triggered when a name of a file disappears and reappears in a directory within a prescribed time window. A name can appear, for example, through a create or rename/move operation. Similarly, a name can disappear from a namespace through a delete or rename/move operation. In this traditional attribute tunneling, using Microsoft Windows as an example, what gets tunneled is a fixed set of properties {CreationTime, ObjectID, ShortName/LongName}. Microsoft Windows, for example, provides an API named ReplaceFileW( ) that helps tunnel additional data/metadata like file attributes, alternate/named streams etc. However, in a rich storage system items can have any amount, arbitrary in their number and size, of rich data attached to it. The mechanisms disclosed herein can accomplish the tunneling of this rich data in an efficient manner that ensures very high performance under varying conditions. Since arbitrary amount of rich data can be attached to items, it is often stored in a normalized manner. The normalization of storage implies that rather than storing along with an item in the same table, the rich data is instead stored in one or more separate tables. The association of rich data to an item happens by mapping the data (referential integrity) to the itemID. In one instance, to achieve rich data tunneling, the itemID is stored in a tunnel cache. When rich data tunneling is triggered, the itemIDs of the related items are switched. Thus, tunneling is accomplished without actually having to copy over the rich data itself.

To further illustrate rich data tunneling, an assumption is made that a triggering event involves two rename operations (other triggering scenarios can include, but are not limited to, delete-create, delete-rename, rename-create). For example, a user opens a document (e.g., TRIP.DOC), through a word processing application. When the user makes changes to the document and saves it, the original document is not directly updated. Instead the word processor writes the latest contents to a temporary file, for example, X.TMP. If the write to the file X.TMP completed without any errors then as part of a safe save operation what may happen is the following two renames. The first rename operation renames the original document to create a backup (e.g., BACKUP.DOC). Now, the document that has the updated content (X.TMP) is renamed to the original document (TRIP.DOC).

Figure 4:
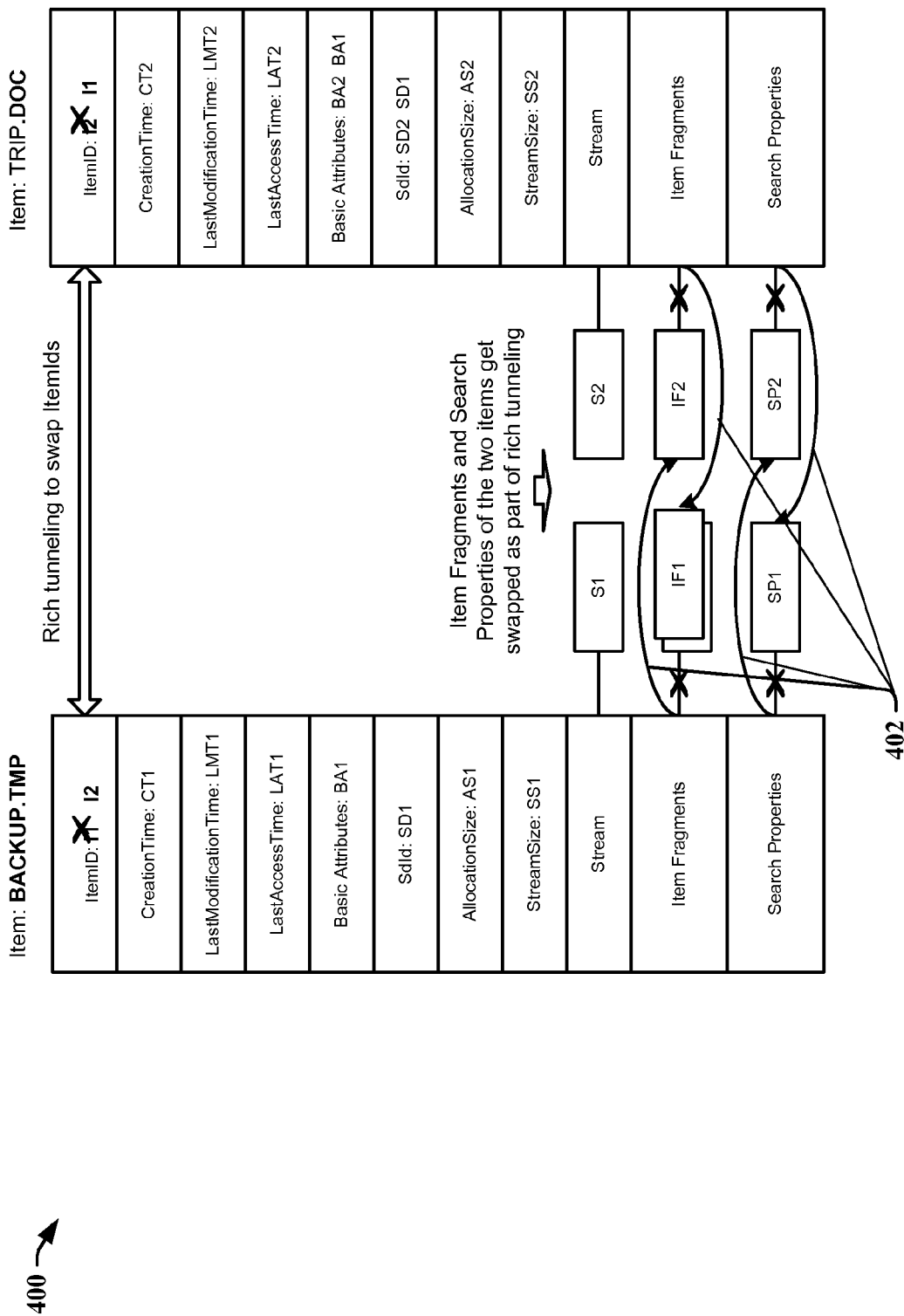
FIG. 4 illustrates a logical data flow during rich data tunneling for a file system in accordance with an aspect of an embodiment.

FIG. 4 illustrates a logical data flow 400 during rich data tunneling for a file system. In this example, rich data tunneling is triggered on a successful call to a rename-rename like the following:

RENAME TRIP.DOC BACKUP.TMP
RENAME X.TMP TRIP.DOC

FIG. 4 shows the state of the items after the second RENAME operation. And, the arrows 402 indicate the logical work that occurs as part of the rich data tunneling.

To explain what happens underneath to achieve rich data tunneling, consider abstractions of rich data element tables as follows. TABLE 1 shows an two item table and associated primary reference identifications I1 and I2 for two different data sets.

TABLE 1

Item Table

| ItemID | Name | FileStream |
|---|---|---|
| I1 | ItemA | FStream1 |
| I2 | ItemB | FStream2 |

TABLE 2 depicts an ItemFragment Table (of rich data elements) that links to the two data sets via their primary reference identifications (e.g., I1, I2).

TABLE 2

ItemFragment Table

| ItemID | ItemFragmentID | ItemFragment |
|---|---|---|
| I1 | 1 | StickyNote1 |
| I1 | 2 | StickyNote2 |
| I1 | 3 | Picture1 |
| I1 | 4 | Contact1 |
| I2 | 5 | Picture2 |
| I2 | 6 | Annotation1 |

In this case, the tunneling of rich data between items I1 and I2 can be accomplished, in constant time, by swapping the ItemID in TABLE 1 as shown in TABLE 3.

TABLE 3

Item Table After Tunneling

| ItemID | Name | FileStream |
|---|---|---|
| I2 | ItemA | FStream1 |
| I1 | ItemB | FStream2 |

However, if a storage system has a constraint that itemID of an item is immutable during the life of the item an additional level of indirection can be utilized to achieve tunneling in constant time as follows:

TABLE 4

Item Table with Immutable Items

| ItemID | Name | FileStream |
|---|---|---|
| I1 | ItemA | FStream1 |
| I2 | ItemB | FStream2 |

A new table may then be introduced to provide the additional level of indirection/normalization such as, for example, TABLE 5 depicting an ItemToItemFragmentMapping Table. Alternatively we can add the column FragmentCollectionId to the Item Table (TABLE 4) itself to avoid the creation of an extra table.

TABLE 5

ItemToItemFragmentMapping Table

| ItemID | FragmentCollectionID |
|--------|----------------------|
| I1     | FC1                  |
| I2     | FC2                  |

TABLE 6

ItemFragment Table

| FragmentCollectionID | ItemFragmentID | ItemFragment |
|----------------------|----------------|--------------|
| FC1 | 1 | StickyNote1 |
| FC1 | 2 | StickyNote2 |
| FC1 | 3 | Picture1 |
| FC1 | 4 | Contact1 |
| FC2 | 5 | Picture2 |
| FC2 | 6 | Annotation1 |

Now, rich data tunneling can be accomplished in constant time by the following change to ItemToItemFragmentMapping Table (TABLE 5):

TABLE 7

ItemToItemFragmentMapping Table After Tunneling

| ItemID | FragmentCollectionID |
|--------|----------------------|
| I1     | FC2                  |
| I2     | FC1                  |

Thus, for example, an entire collection of external storage (arbitrary in number and size) is tunneled in constant time.

Figure 5:
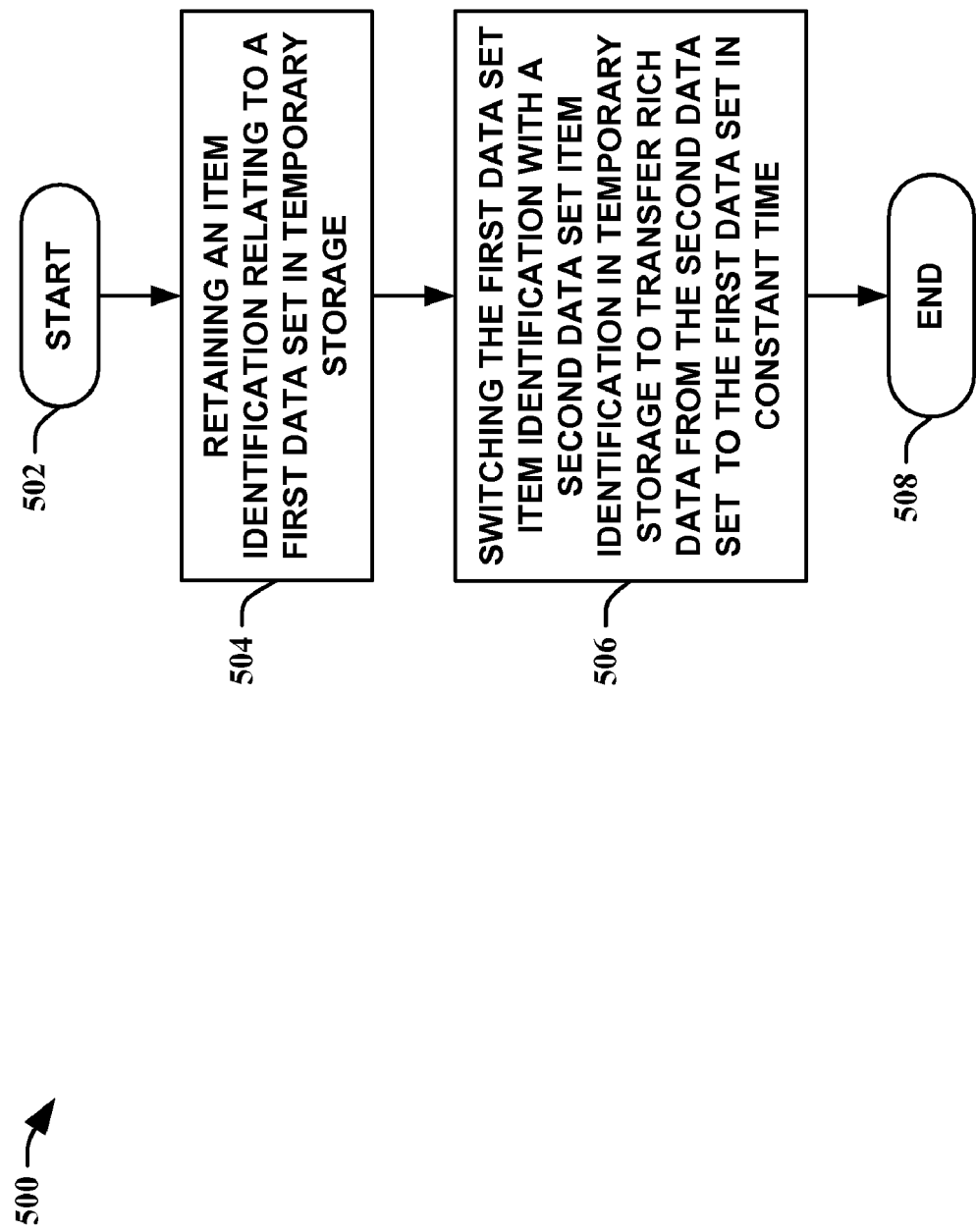
FIG. 5 is a flow diagram of a method for preserving data in accordance with an aspect of an embodiment.
Figure 6:
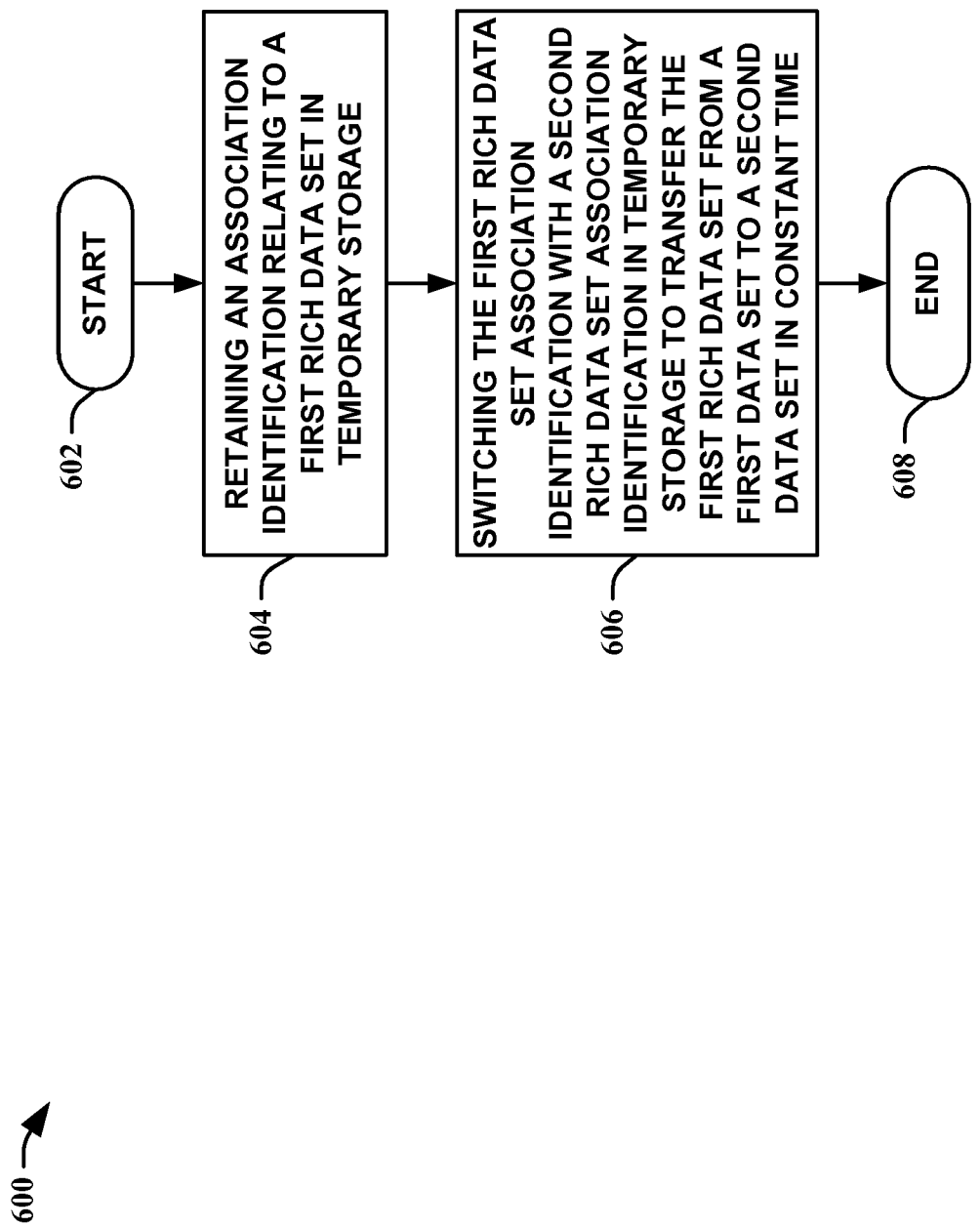
FIG. 6 is another flow diagram of a method for preserving data in accordance with an aspect of an embodiment.

In view of the exemplary systems shown and described above, methodologies that may be implemented in accordance with the embodiments will be better appreciated with reference to the flow charts of FIGS. 5-6. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 5, a flow diagram of a method 500 for preserving data in accordance with an aspect of an embodiment is shown. The method 500 starts 502 by retaining an item identification relating to a first data set in temporary storage 504. The temporary storage can include, but is not limited to, tunnel cache and the like. The first data set item identification is then switched with a second data set item identification in temporary storage to transfer rich data from the second data set to the first data set in constant time 506, ending the flow 508. The item identification is typically a primary reference indicator that allows a system/application to uniquely identify data. This method 500 can be utilized even if a data system/application is unaware of the rich data. This allows rich data tunneling within rich and/or non-rich systems and/or applications alike to preserve the rich data. This is especially useful when rich data systems/applications are utilized with legacy systems/applications. The rich data is preserved in constant time regardless of the size and/or number of rich data elements contained in the rich data. Since the rich data is not duplicated, its size and/or number of elements does not impact the preservation of the rich data. This can substantially increase the performance of a system and/or application and the like and allow for better resource utilization and/or planning (process time is a constant value). One can appreciate that method 500 can be employed with any number of data sets.

Looking at FIG. 6, another flow diagram of a method 600 for preserving data in accordance with an aspect of an embodiment is depicted. The method 600 starts 602 by retaining an association identification relating to a first rich data set in temporary storage 604. An association identification facilitates in linking/identifying rich data and its associated data/file. New levels of indirection/normalization can be added to obtain association identifications for data/files that have immutable properties. If tables are employed for linking/associating rich data, additional intermediate tables can be employed to accomplish this. The temporary storage can include, but is not limited to, tunnel cache and the like. The first rich data set association identification is then switched with a second rich data set association identification in temporary storage to transfer the first rich data set from a first data set to a second data set in constant time 606, ending the flow 608. Thus, without modifying primary references/itemIDs of data sets, rich data can be preserved. One can appreciate that method 600 can be employed with any number of rich data sets. It can also be utilized in rich and/or non-rich environments as well, with or without knowledge of the existence of the rich data and in constant time.

Figure 7:
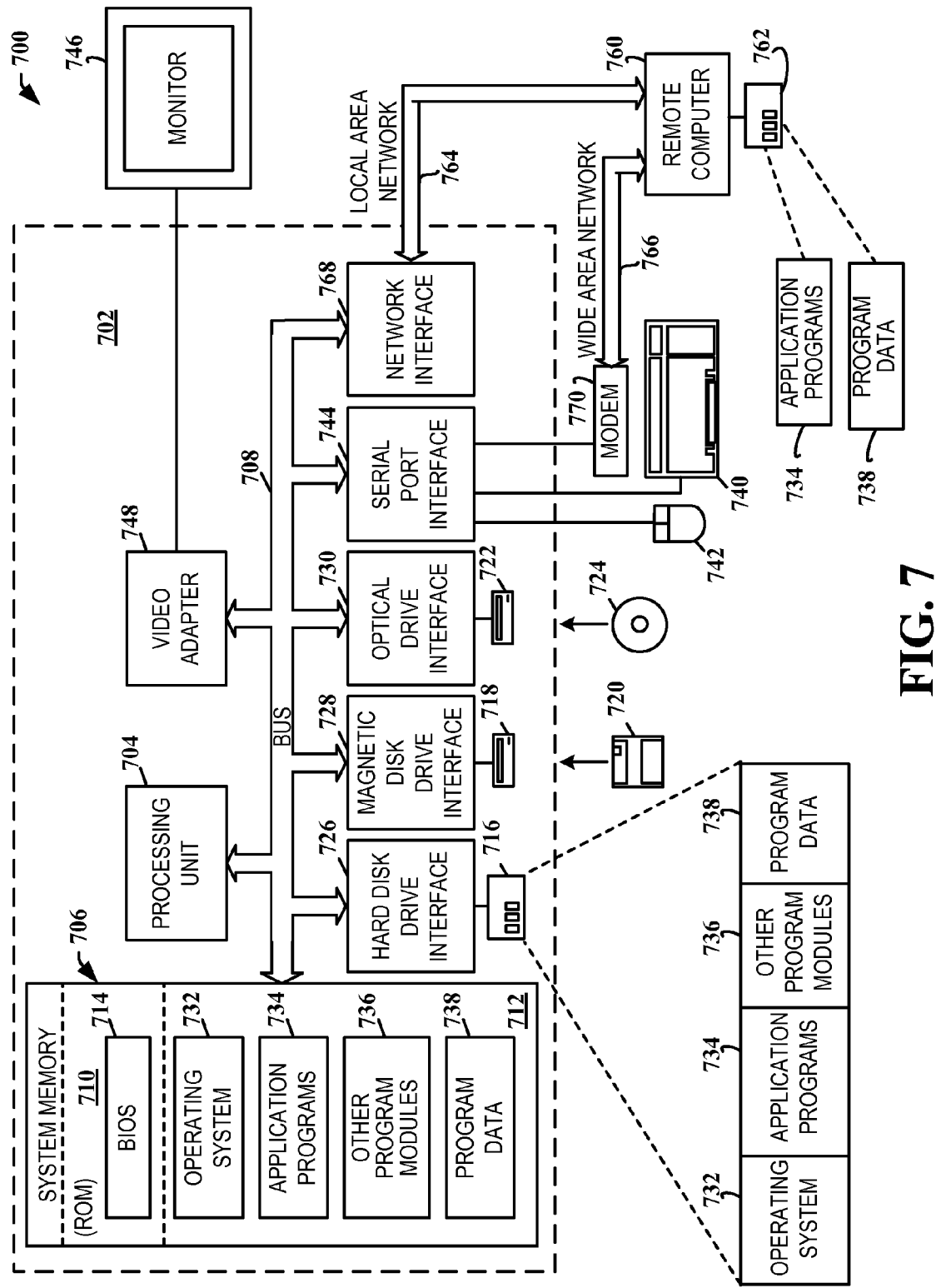
FIG. 7 illustrates an example operating environment in which an embodiment can function.

In order to provide additional context for implementing various aspects of the embodiments, FIG. 7 and the following discussion is intended to provide a brief, general description of a suitable computing environment 700 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on standalone computers. In a distributed computing environment, program modules can be located in local and/or remote memory storage devices.

With reference to FIG. 7, an exemplary system environment 700 for performing the various aspects of the embodiments include a conventional computer 702, including a processing unit 704, a system memory 706, and a system bus 708 that couples various system components, including the system memory, to the processing unit 704. The processing unit 704 can be any commercially available or proprietary processor. In addition, the processing unit can be implemented as multi-processor formed of more than one processor, such as can be connected in parallel.

The system bus 708 can be any of several types of bus structure including a memory bus or memory controller, a peripheral bus, and a local bus using any of a variety of conventional bus architectures such as PCI, VESA, Microchannel, ISA, and EISA, to name a few. The system memory 706 includes read only memory (ROM) 710 and random access memory (RAM) 712. A basic input/output system (BIOS) 714, containing the basic routines that help to transfer information between elements within the computer 702, such as during start-up, is stored in ROM 710.

The computer 702 also can include, for example, a hard disk drive 716, a magnetic disk drive 718, e.g., to read from or write to a removable disk 720, and an optical disk drive 722, e.g., for reading from or writing to a CD-ROM disk 724 or other optical media. The hard disk drive 716, magnetic disk drive 718, and optical disk drive 722 are connected to the system bus 708 by a hard disk drive interface 726, a magnetic disk drive interface 728, and an optical drive interface 730, respectively. The drives 716-722 and their associated computer-readable media provide nonvolatile storage of data, data structures, computer-executable instructions, etc. for the computer 702. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 700, and further that any such media can contain computer-executable instructions for performing the methods of the embodiments.

A number of program modules can be stored in the drives 716-722 and RAM 712, including an operating system 732, one or more application programs 734, other program modules 736, and program data 738. The operating system 732 can be any suitable operating system or combination of operating systems. By way of example, the application programs 734 and program modules 736 can include a data preservation scheme in accordance with an aspect of an embodiment.

A user can enter commands and information into the computer 702 through one or more user input devices, such as a keyboard 740 and a pointing device (e.g., a mouse 742). Other input devices (not shown) can include a microphone, a joystick, a game pad, a satellite dish, a wireless remote, a scanner, or the like. These and other input devices are often connected to the processing unit 704 through a serial port interface 744 that is coupled to the system bus 708, but can be connected by other interfaces, such as a parallel port, a game port or a universal serial bus (USB). A monitor 746 or other type of display device is also connected to the system bus 708 via an interface, such as a video adapter 748. In addition to the monitor 746, the computer 702 can include other peripheral output devices (not shown), such as speakers, printers, etc.

It is to be appreciated that the computer 702 can operate in a networked environment using logical connections to one or more remote computers 760. The remote computer 760 can be a workstation, a server computer, a router, a peer device or other common network node, and typically includes many or all of the elements described relative to the computer 702, although for purposes of brevity, only a memory storage device 762 is illustrated in FIG. 7. The logical connections depicted in FIG. 7 can include a local area network (LAN) 764 and a wide area network (WAN) 766. Such networking environments are commonplace in offices, enterprise-wide computer networks, intranets and the Internet.

When used in a LAN networking environment, for example, the computer 702 is connected to the local network 764 through a network interface or adapter 768. When used in a WAN networking environment, the computer 702 typically includes a modem (e.g., telephone, DSL, cable, etc.) 770, or is connected to a communications server on the LAN, or has other means for establishing communications over the WAN 766, such as the Internet. The modem 770, which can be internal or external relative to the computer 702, is connected to the system bus 708 via the serial port interface 744. In a networked environment, program modules (including application programs 734) and/or program data 738 can be stored in the remote memory storage device 762. It will be appreciated that the network connections shown are exemplary and other means (e.g. wired or wireless) of establishing a communications link between the computers 702 and 760 can be used when carrying out an aspect of an embodiment.

In accordance with the practices of persons skilled in the art of computer programming, the embodiments have been described with reference to acts and symbolic representations of operations that are performed by a computer, such as the computer 702 or remote computer 760, unless otherwise indicated. Such acts and operations are sometimes referred to as being computer-executed. It will be appreciated that the acts and symbolically represented operations include the manipulation by the processing unit 704 of electrical signals representing data bits which causes a resulting transformation or reduction of the electrical signal representation, and the maintenance of data bits at memory locations in the memory system (including the system memory 706, hard drive 716, floppy disks 720, CD-ROM 724, and remote memory 762) to thereby reconfigure or otherwise alter the computer system's operation, as well as other processing of signals. The memory locations where such data bits are maintained are physical locations that have particular electrical, magnetic, or optical properties corresponding to the data bits.

Figure 8:
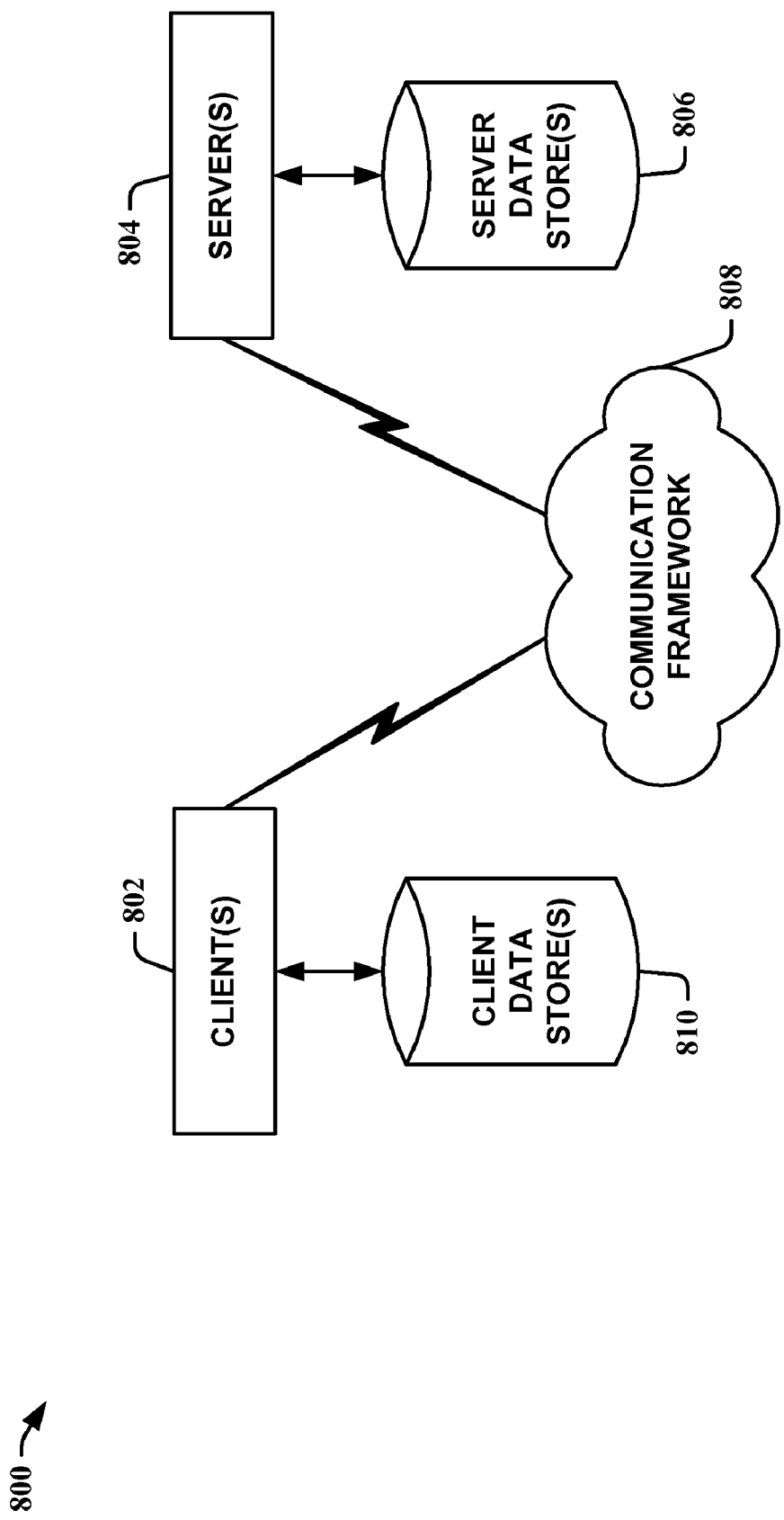
FIG. 8 illustrates another example operating environment in which an embodiment can function.

FIG. 8 is another block diagram of a sample computing environment 800 with which embodiments can interact. The system 800 further illustrates a system that includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). One possible communication between a client 802 and a server 804 can be in the form of a data packet adapted to be transmitted between two or more computer processes. The system 800 includes a communication framework 808 that can be employed to facilitate communications between the client(s) 802 and the server(s) 804. The client(s) 802 are connected to one or more client data store(s) 810 that can be employed to store information local to the client(s) 802. Similarly, the server(s) 804 are connected to one or more server data store(s) 806 that can be employed to store information local to the server(s) 804.

It is to be appreciated that the systems and/or methods of the embodiments can be utilized in data preservation facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that preserves data, the system comprising a plurality of components, each component comprising computer-executable instructions recorded upon computer readable media and the components comprising:
   a trigger monitoring component that
      monitors file system events for a tunneling trigger event, wherein the tunneling trigger event is one of a rename file system operation, a delete-create file system operation, a delete-rename file system operation, and/or a rename-create file system operation,
      determines that the tunneling trigger event has occurred, and
      upon determining that the tunneling trigger event has occurred, initiates rich data tunneling; and
   a tunneling component that receives original data associated with a first item ID, wherein the first item ID is also associated with a rich data,
      receives changed data associated with a second item ID,
      stores both the first item ID and the second item ID in temporary storage,
      swaps the first item ID and the second item ID such that the first item ID is now associated with the changed data and the rich data and the rich data is now associated with the changed data, and
      wherein the tunneling component utilizes tunnel cache to swap item IDs.

2. The system of claim 1, wherein the tunneling component swaps rich data item association identifications in constant time when data set item identifications are immutable by introducing an additional level of indirection.

3. The system of claim 1, the tunneling component further employs proxy representations of data set item identifications to allow preservation of data between data set item identifications that have item identification altering restrictions.

4. The system of claim 1 further comprising a non-relational file system which saves data associated with at least one relational file system item.

5. The system of claim 1 further comprising a non-relational file system which preserves data.

6. The system of claim 1, wherein the system further comprises a computer, a server, and/or a handheld electronic device.

7. A method for preserving data, the method comprising the execution of computer-executable instructions upon one or more computer processors, the method further comprising:
   monitoring file system events for a tunneling trigger event wherein the tunneling trigger event is one of a rename file system operation, a delete-create file system operation, a delete-rename file system operation, and/or a rename-create file system operation,
   determining that the tunneling trigger event has occurred;
   receiving original data associated with a first item ID, the first item ID also associated with rich data;
   receiving changed data associated with a second item ID;
   storing both the first item ID and the second item ID in temporary storage;
   utilizing tunnel cache to temporarily store data set item IDs; and
   swapping the first item ID and the second item ID such that the first item ID is now associated with the changed data and the rich data the rich data is now associated with the changed data.

8. The method of claim 7 further comprising:
   swapping rich data item association identifications in constant time when data set item identifications are immutable by introducing an additional level of indirection.

9. The method of claim 7 further comprising:
   establishing a proxy representing at least one of the first item ID and the second item ID when there is a data restriction on at least one of the rich data and the original data.

10. The method of claim 7 further comprising a non-relational file system saving data associated with at least one relational file system item.

11. The method of claim 7 further comprising a relational database preserving data.

12. A computer readable medium having stored thereon computer executable instructions which, when executed upon one or more computer processors, perform the method of claim 7.

* * * * *